April 15, 1958  B. AGNEW  2,830,488
INTERFERENTIAL MEASURING DEVICE
Filed Sept. 20, 1954  2 Sheets-Sheet 1

INVENTOR.
Boyd Agnew
BY
Donald L. Royce
AGENT

April 15, 1958

B. AGNEW 2,830,488

INTERFERENTIAL MEASURING DEVICE

Filed Sept. 20, 1954

INVENTOR.
Boyd Agnew
BY
Donald L. Ryu
AGENT

United States Patent Office 2,830,488
Patented Apr. 15, 1958

2,830,488

INTERFERENTIAL MEASURING DEVICE

Boyd Agnew, Pasadena, Calif.

Application September 20, 1954, Serial No. 456,996

14 Claims. (Cl. 88—14)

The present invention relates generally to a precision measuring device and relates more specifically to an interferentially operated measuring device adapted for use in making measurements in the order of one half a wave length of a monochromatic light.

Interferometers of various types utilizing mirrors, optical flats, prisms, or the like, have long been used as a means for measuring various conditions wherein accuracy requires deviations within a tolerance magnitude of one hundred thousandths to millionths of an inch. Such devices utilize the effect known as "Newton's Rings" or interference light bands created under conditions where spacing between objects or relative angular positions equal one half a light wave length or multiples thereof. However, these prior devices, while accurate for each particular installation and setting, require considerable time and effort for establishment of the devices in position to enable a reading thereof. In situations requiring measurement of various locating points, individual settings must be used which may cause an inherent error due to a position change of the interferometer.

Interferometers of the type presently known project a beam of monochromatic light that may be reflected from a mirror or other like surface. With a change in position of the mirror more than a very few degrees off the axis of the projected beam, it becomes necessary to change the position of the interferometer, thus tending to destroy the original position and making comparison between measurements taken from various positions following movement of the interferometer impossible, or in any event, extremely inaccurate for the purposes defined. Accordingly, it has become necessary to devise an instrument utilizing the length of a fixed quantity such as the wave length of a particular light source as a standard and to enable use of this situation over large planar surfaces such as those associated with surface plates and other like flat objects. Additionally, in order to insure uniformity in precision manufacture, it has been found desirable to utilize such checking instruments for setting jigs or other manufacturing tools, to maintain these tools in precise alignment and to enable adjustment and calibration of like tools at remote places.

Accordingly, therefore, it is one important object of the present invention to provide an interferential measuring instrument or device that may be utilized to provide accurate precise measurements over large areas or remotely established points.

It is another important object of the present invention to provide an interferential measuring device having means for projecting an arcuate light beam and for recollecting portions of this light beam to establish light interference patterns or bands.

It is a further important object of the present invention to provide an interferential measuring device having novel means for creating the beforementioned arcuate beam and novel means for adjustably positioning a telescopic eye piece relative to a housing and a movable reflecting means.

Other and further important objects of the present invention will become apparent from the disclosures in the following detailed specification, appended claims, and accompanying drawings wherein:

Fig. 3 is an enlarged sectional view showing the measuring device of the present invention and operating means therefor as taken substantially as indicated by line 3—3, Fig. 1;

Figure 1:
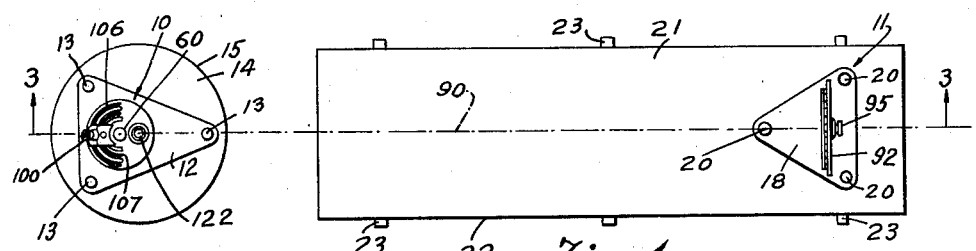
Fig. 1 is a top plan view showing one installation of the present invention.
Figure 2:
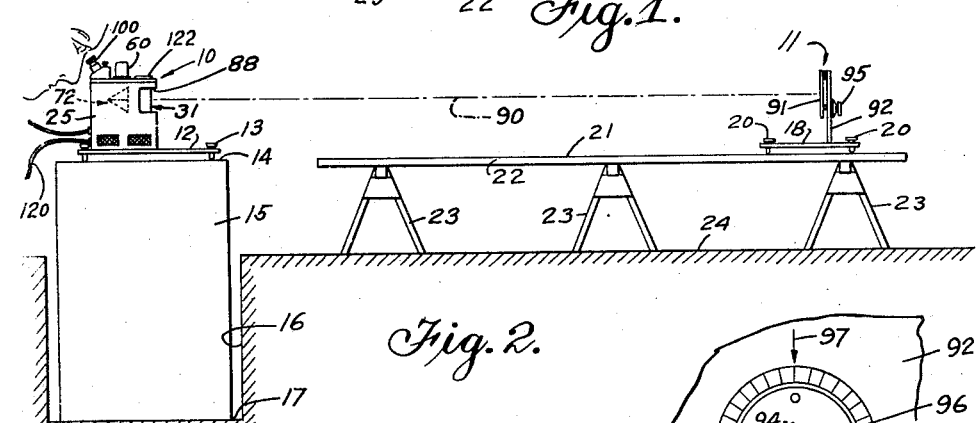
Fig. 2 is a side elevational view of a typical installation.

With reference to the drawing, and referring primarily to Figs. 1 and 2, the device of the present invention includes a projecting unit indicated generally at 10 and a reflecting or mirror unit indicated generally at 11. The projecting unit 10 is adapted to be mounted on a triangular base structure 12 having positioning screw legs 13 at the three corners thereof. The legs 13 are adapted to contact an upper planar surface 14 of a pedestal 15, or the like, having considerable mass and being positioned, for example, on a recess 16 to a firm foundation 17. The mass of the pedestal 15 reduces the frequency of vibration to a low level thereby, for all practical purposes, steadily to support the projection unit 10.

The reflecting mirror unit 11 is adapted for disposition on a triangular base 18 having screw legs 20 at each corner thereof. The legs 20 are adapted to contact an upper surface 21 of an item 22 whose flatness characteristics are to be measured. The item 22 may be supported on supports 23 which are adapted to rest on a suitable reasonably flat surface 24. The item 22 may be a face plate, or the like, for example, however, the device of the present invention may be utilized with many other devices or units without departing from the spirit and scope hereof.

With reference primarily to Fig. 3, the projection unit 10 comprises a generally circular housing 25 defining a chamber 26. The upper portion of the housing 25 is provided with a cover or top wall member 27 that may be secured thereto as by the screws 28. The bottom portion of housing 25 is secured to the triangular base member 12 as by the screws 30.

A rotating assembly indicated generally at 31 is disposed within the chamber 26 in the housing 25. By way of example only, the assembly 31 is shown as being a unitary structural device. However, this device may be made from multiple pieces, if desired. The assembly 31 includes a generally cylindrical casing 32 that has a top wall 33 and a bevelled wall portion 34. A bottom wall for the casing 32 is divided as by an annular glass or otherwise transparent member 35 that is set in a recess 36 in the lower end of the casing 32 and held therein as by a snap ring 37, for example. One side of the casing 32 opposite from the bevelled portion 34 has an opening 38 there being a transverse partition 40 adjacent the lower edge of the opening 38 with the partition 40 having branch partitions 41 and 42 which are operatively connected with the casing 32.

In order rotatively to support the rotating assembly 31, a bearing shaft of 43 is connected to the transverse partition 40 as at 44 and extends through a bushing 45 in the central area of the transparent bottom closure 35. The lower end of the shaft 43 is fitted with a jewel bearing 46 that is adapted for reception on a conical seat member 47. The seat member 47 is disposed in a suitable recess 48 in the supporting member 12. A second shaft 50 is secured to the top wall 33 of the assembly 31 as at 51 and extends upwardly through a bushing 52 disposed in the top wall or cover 27. A bearing member 53 is fixed to the upper end shaft 50, the bearing member 53 having a conical seat adapted for cooperation with a jewel bearing 54. The bearing 54 is carried on the lower end of a shaft 55 that is slidably disposed in a fitting 56. A compression spring 57 extends between the lower end of the fitting 56 and the bearing 54 thereby to spring load the bearing with respect to the bearing member 53. A pair of nuts 58 may be used to adjustably position the fitting 56 with respect to a housing 60 in which the fitting 56 is threadably disposed. The housing 60 is secured, as by a flange 61 to the upper surface of the cover 27. The housing 60 is further provided with a dust cap 62.

It may thus be seen that the rotating assembly 31 is disposed for rotary movement within the chamber 26 and on jewelled bearings to reduce frictional losses. In other words, the assembly 31 is mounted in the bearings 46 and 54 for free movement in the chamber 26 and spring loaded to eliminate any tendency for wobble of the assembly. A counterweight 63 may be formed as a portion of the casing 32 dynamically and statically to balance the rotating assembly 31 and components contained therein.

Within the rotating assembly 31 are arranged a plurality of optical components that are utilized in conjunction with the present device and form a portion of the interferometer utilized herewith. Arranged in the branch partition 41 is a lens group consisting of a collecting lens 64 and a collimating lens 65 disposed in a suitable retainer 66. A second lens group is positioned in the branch partition 42 and consists of a collecting lens 67 and a collimating lens 68 arranged in a suitable retainer 70. The two lens groups thus defined are disposed at an angle to the axis of the rotating assembly 31 there being a reflecting element or mirror 71 disposed intermediate these lens elements and vertically within the assembly 31, the upper and lower ends of the mirror 71 being secured in any suitable manner to the branch partitions 41 and 42.

A prism doublet 72 is disposed in the upper portion of this rotating assembly 31, this doublet having upper and lower individual prisms 73 and 74 cemented together along adjacent surfaces 75. The outer edges of the prisms 73 and 74 are held in retainers 76 and 77 that are respectively secured to the upper wall 33 and transverse partition 40. The prisms 73 and 74 are retained in position as by a snap ring 78. The apex of the prisms 73 and 74 is secured in a V-notch 80 in a portion of the branch partition 42 depended inwardly from the casing 32. For a purpose to be hereinafter more fully described, the angularly disposed portion 34 of the casing 32 is provided with a third lens group consisting of a collimating lens 81 and a collected lens 82 disposed in a suitable retainer 83.

A source of light is established as by a plurallity of bulbs or tubes 84 that are positioned in suitable sockets 85 connected, for example, to the support member 12. The light source utilized with the present invention is preferably of a monochromatic variety and may be, for example, derived from a mercury isotrope which has a wave length of .0000198". For all practical purposes, it may be considered that this wave length of the mercury isotrope is .00002" or a half wave length of .00001". The bulbs 84 are arranged annularly about the shaft 43 so as to provide a light source regardless of the position of the rotating assembly 31. Light from the bulbs 84 passes through the transparent wall or panel 35, through the lenses 64 and 65 to the mirror 71. From the mirror 71 the light is reflected through the lenses 67 and 68 and into the prism doublet 72. A portion, approximately half, of the light strikes the surface 75 and is reflected to a surface 86 and from there outwardly through the opening 38 in the casing 32. Another portion of the light passes through the prism 73 and in reflected from the surface 87, the light passing outwardly through the opening 38 and through an arcuate opening 88 formed in the wall of the housing 25. The beam of light thus formed is indicated by the dotted lines 90 and is projected to an adjustable mirror 91 formed as a portion of the reflecting unit 11.

Figure 5:
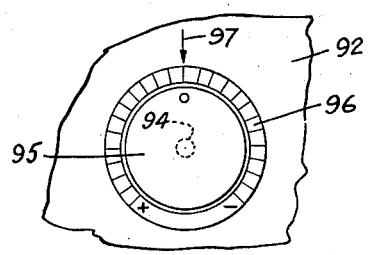
Fig. 5 is an enlarged fragmentary view showing a portion of the calibrated dial utilized with the movable mirror of the present invention.

The reflecting unit 11 comprises a vertical standard 92 having a hinge 93 adjacent the upper end thereof. The hinge 93 is connected to an upper portion of the mirror 91. The mirror 91 is adapted for adjustable movement angularly with respect to the surface 21 of the element 22 as by a screw 94 controlled by a knob 95. The knob 95 carries an indicated dial 96, Figs. 3 and 5, that has indices adapted for readable cooperation with an index 97 formed on the rearward surface of the standard 92. The dial 96 may be provided with positive and negative indications for a purpose to be hereinafter more fully described.

The light beam reflected from the mirror 91 returns to the prism doublets 72. For example, the outer edge light beams as defined by the lines 90a and 90b create an interference pattern, the beam 90a being reflected from the surface 87 and surface 75 toward the lenses 81 and 82 while the beam 90b is reflected from the surface 86, and passes through the prisms 74 and 73 along a line 90c which will be an interference pattern when half wave length measurements or multiples thereof are present depending upon the angular disposition of the mirror 91.

Figure 4:
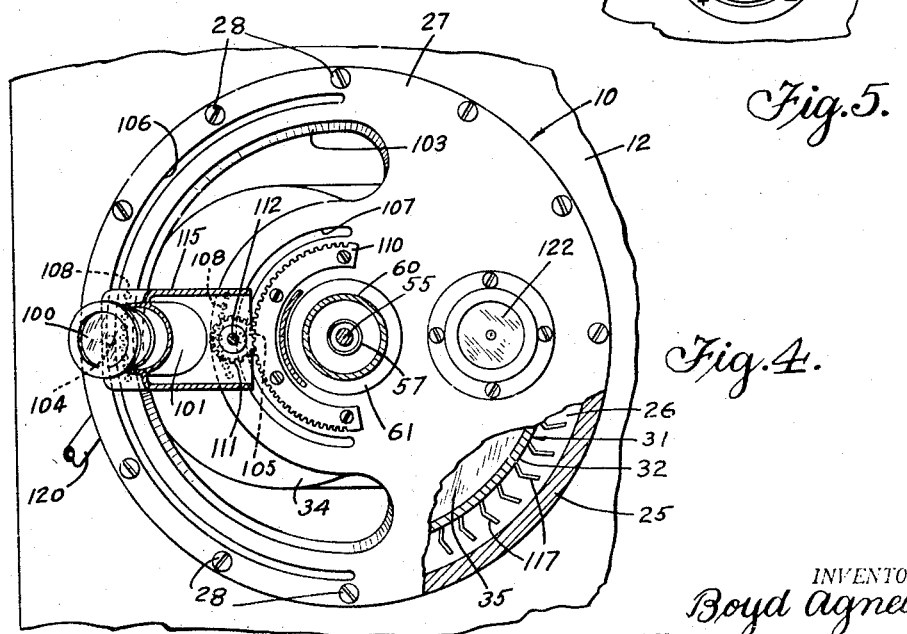
Fig. 4 is a top plan view, partially in section of the projecting portion of the present invention as taken substantially as indicated by line 4—4, Fig. 3.

In order to view the interference pattern thus defined, with reference primarily to Figs. 3 and 4, a suitable telescopic eye piece 100 is mounted in an angularly disposed upper retainer 101 and a lower retainer 102 and in an angularly disposed arcuate slot 103 in the upper wall 27 of the housing 25. The retainers 101 and 102 have their outer ends spaced apart and located as by pins 104 and 105 that are adapted to travel in arcuate slots 106 and 107.

A plurality of ball or roller bearings 108 are disposed between the retainer 101 and the upper surface of the wall 27 in order to provide an anti-friction means. The telescopic eye piece 100 is adjustably disposed relative to the arcuate slot 103 as by a sector gear 110 that is secured to the wall 27. A pinion gear 111 is secured to the lower end of a shaft 112 the upper end of which is fitted with a knob 113 and biased downwardly into engagement with the gear 110 as by a compression spring 114. The shaft 112 is rotatively supported in a bracket 115 formed as a portion of the retainer 101. It may thus be seen that the telescope 100 may be moved circumferentially with respect to the rotating assembly 31 as by turning of the knob 113 or may rapidly be moved as by lifting of the knob 113 moving the gear 111 out of engagement with the gear 110. The angular disposition of the telescopic eye piece 100 is on the optical axis of the lenses 81 and 82 and has an axis 116 that is perpendicular to the surface 87 of the prism 83 so that light interference patterns may be seen by viewing therethrough in a manner and in accordance with conventional practice in conjunction with interferential measuring devices.

In accordance with the present invention, the rotating assembly 31 must be rotated. To accomplish such rotation the lower end of the casing 32 is provided with a plurality of generally radially extending turbine buckets or blades 117. An annular baffle 118 extends inwardly from the housing 25 immediately above the blades 117. A jet of motive fluid is adapted for impingement upon the blades 117, as from a nozzle 120 disposed in a bushing 121 in the wall of the housing 25. Thus, the rotating assembly 31 may be rotated without physical attachment of the rotating means to the assembly. The nozzle 120 may be connected with any suitable source of motive fluid (not shown) such as, for example, compressed air, and may be regulated in its delivery to the blades 117 as by any conventional suitable means (also not shown).

In use of the present invention, the projecting unit 10 is disposed on the upper surface 14 of the pedestal 15 and the screw legs 13 are adjusted until a level condition is established as indicated by an all-direction bubble type level 122 attached to the upper surface of the top wall 27. The bulbs 84 are next energized and the rotating assembly 31 is rotated as by the turbine 117 and nozzle 120. Thus, within the limit of the arcuate opening 88 in the housing 25 a beam traversing a quadrant shape will be projected from the projecting unit 10. The reflecting unit 11 may be placed at any position within the light fan created by the projection of light between beam limits defined by the opening 88 and may be adjusted by means of the knob 95 and screw 94 until the mirror 91 is exactly parallel with the forward surface of the prism doublets 72. In this condition, no interference pattern will be evident when the reflected light is viewed through the telescopic eye piece 100. It may be seen that the reflection from the mirror 91 will be intermittent and of a frequency dependent upon the rotary speed of the rotating assembly 31. This speed of rotation may be in the nature of 1,000 to 3,000 R. P. M. for example, so as to take advantage of normal vision decay in the eyes of the viewer and therefore make the image appear as a constant fixed image rather than an intermittent one.

The reflecting unit 11 may thereafter be moved to any desired position on the surface 21 and within the light fan projected from the projecting unit 10. When in this new position, the unit 11 may be disposed in a high or low point on the surface 21. In this instance an interference pattern will be seen through the eye piece 100. The knob 95 is then moved to again align the mirror 91 with the face of the prism doublet 72 or until no interference pattern is seen through the eye piece. The exact height of the high or low area in the surface 21 may then be read directly on the dial 96 through use of the indicating arrow 97. Successive measurements may thereafter be taken by successive movement of the reflecting unit 11 to different positions on the surface 21 without a change in setting or disposition of the projecting unit 10, thereby permitting accurate comparison between such readings.

It may thus be seen that the present interferential measuring device utilizes the principles of the well-known interferometer and applies such principles through use of a novel device for practical applications in measurement of extremely short distances without the necessity for calibration or frequent adjustment of the projecting unit 10.

Having thus described the invention and the present embodiments thereof, it is desired to emphasize the fact that many modifications may be resorted to in a manner limited only by a just interpretation of the following claims.

I claim:

1. An interferential measuring device for determining surface flatness comprising: a source of light, rotatably mounted prism means for collecting said light from said source and for projecting parallel light waves; reflecting means disposed on said surface in the path of and remote from said first mentioned means for receiving and reflectively returning said light waves; means included in and forming a portion of said prism means for creating interference between said projected and said returning light waves; means for viewing an interference pattern produced by said interference; and means for rotating said prism means and said means included therein, whereby any slight deviation in the flatness of the surface being measured may be determined by reference to said interference pattern viewed through said viewing means.

2. An interferential measuring device for determining surface flatness comprising: a source of light; rotatably mounted prism means for collecting said light from said source and for projecting parallel light waves; reflecting means disposed on said surface in the path of and remote from said first mentioned means for receiving and reflectively returning said light waves; means included in and forming a portion of said prism means for creating interference between said projected and said returning light waves; angularly adjustable means for viewing an interference pattern produced by said interference; and means for rotating said prism means and said means included therein, whereby any slight deviation in the flatness of the surface being measured may be determined by reference to said interference pattern viewed through said viewing means.

3. An interferential measuring device for determining surface flatness comprising: a three point support; a source of light; rotatably mounted prism means for collecting said light from said source and for projecting parallel light waves, said means being disposed on said three point support; reflecting means disposed on said surface in the path of and remote from said first mentioned means for receiving and reflectively returning said light waves; means included in and forming a portion of said prism means for creating interference between said projected and said returning light waves; angularly adjustable means for viewing an interference pattern produced by said interference; and means for rotating said prism means and said means included therein, whereby any slight deviation in the flatness of the surface being measured may be determined by reference to said interference pattern viewed through said viewing means.

4. An interferential measuring device according to claim 3 wherein said reflecting means is provided with a three point support and means are provided for adjustable positioning thereof.

5. An interferential measuring device according to claim 3 wherein the means for rotating the prism means comprises a turbine.

6. In an interferential measuring device for determining surface flatness comprising, the combination of: a housing; means for supporting said housing; a rotating assembly mounted for rotation in said housing; said assembly including a prism forming one element of an interferometer; a source of light; means for rotating said assembly; means for viewing a light interference pattern produced by said prism; and a mirror forming another element of said interferometer, adapted for remote disposition from said interferometer, said mirror being adapted to be adjustably positioned on said surface to be measured, in the path of light waves emanating from said prism, whereby any slight deviation in the flatness of said surface may be determined by reference to said interference pattern viewed through said viewing means.

7. An interferential measuring device according to claim 6 wherein means are provided for angularly adjusting said viewing means relative to said housing.

8. An interferential measuring device according to claim 6 wherein the means for rotating said assembly comprises a turbine.

9. An interferential measuring device according to claim 6 wherein said source of light is fixed to said housing and is monochromatic.

10. An interferential measuring device for determining surface flatness comprising, in combination: a housing; a triangular support for said housing; a rotating assembly positioned in said housing; bearings for supporting said rotating assembly, said assembly including a pair of prisms, light gathering means and light transmitting means; an arcuate opening in said housing; a source of monochromatic light in said housing; a reflecting mirror positioned remote from said housing; a triangular base for said mirror, said base being adapted for disposition of said surface to be measured; means for adjusting the angle of said mirror relative to said surface, said mirror being disposed in the path of light from said source, through said light gathering means and said prisms and through said opening for reflection to said prisms and said light transmitting means; telescope means for viewing the interference light wave pattern thus created; means for adjustably positioning said telescope means about the circumference of said rotating assembly in accordance with the radial angular position of said mirror relative to said opening; and means to rotate said rotating assembly, whereby slight deviation in the flatness of said surface may be determined by reference to said interference pattern viewed through said telescope means.

11. An interferential measuring device according to claim 10 wherein said means for adjusting the position of said telescope includes multiple manually operable mechanism permitting the rapid and slow arcuate movement of said telescope, said mechanism being operatively associated with said housing.

12. An interferential measuring device according to claim 10 wherein said means for rotating said rotating assembly comprises a plurality of turbine blades carried by said assembly and fluid jet nozzle means for directing motive fluid thereagainst.

13. An interferential measuring device according to claim 10 wherein said means for adjusting angle of said mirror is provided with direct reading calibrations for determining the amount of angular disposition of said mirror.

14. An interferential measuring device according to claim 10 wherein at least one of said bearings for said rotating assembly is spring loaded into contact with said assembly.

References Cited in the file of this patent

UNITED STATES PATENTS

| | | |
|---|---|---|
| 1,561,173 | Kosters | Nov. 10, 1925 |
| 2,452,364 | Fowler et al. | Oct. 26, 1948 |

FOREIGN PATENTS

| | | |
|---|---|---|
| 595,211 | Germany | Apr. 12, 1934 |